United States Patent [19]

Gray et al.

[11] Patent Number: 4,569,407
[45] Date of Patent: Feb. 11, 1986

[54] PORTABLE HYDRAULIC SCALE

[75] Inventors: Earl E. Gray, Dallas; Alton T. Timm, Plano, both of Tex.

[73] Assignee: Matthews and Thorp, Dallas, Tex.

[21] Appl. No.: 608,014

[22] Filed: May 7, 1984
(Under 37 CFR 1.47)

[51] Int. Cl.⁴ .................. G01G 19/02; G01G 5/04
[52] U.S. Cl. ............................ 177/208; 177/133; 73/862.58
[58] Field of Search ............... 177/208, 209, 133, 134; 73/862.58

[56] References Cited

U.S. PATENT DOCUMENTS

| 783,667 | 2/1905 | Barclay . | |
|---|---|---|---|
| 1,507,242 | 9/1924 | Meriam . | |
| 1,895,502 | 1/1933 | Vernet et al. . | |
| 2,294,770 | 9/1942 | Bohannan | 265/47 |
| 2,314,011 | 3/1943 | Maurer | 265/47 |
| 2,352,934 | 7/1944 | Bohannan | 265/47 |
| 3,179,192 | 4/1965 | Link | 177/208 |
| 3,191,701 | 6/1965 | Gray | 177/209 |
| 3,378,091 | 4/1968 | Caughley | 177/209 |
| 3,452,600 | 7/1969 | Gray | 73/411 |
| 3,481,414 | 12/1969 | Gray | 177/209 |
| 3,530,949 | 9/1970 | Swersey et al. | 177/209 |
| 4,014,398 | 3/1977 | Gresko | 177/208 |
| 4,036,317 | 7/1977 | Hellkvist | 177/209 |

Primary Examiner—E. A. Goldberg
Assistant Examiner—Patrick W. Foster
Attorney, Agent, or Firm—Richards, Harris, Medlock & Andrews

[57] ABSTRACT

A weighing apparatus which eliminates knife edges, levers and linkages comprising a plurality of load bearing fluid cylinders supported by a base, a weighing platform supported by the load bearing cylinders. A plurality of secondary cylinders, hydraulically connected to the load bearing cylinders. The secondary cylinder being located under one end of a pivotal torque plate and a summing cylinder located under the other end of the plate. The summing cylinder being connected to a readout means.

21 Claims, 4 Drawing Figures

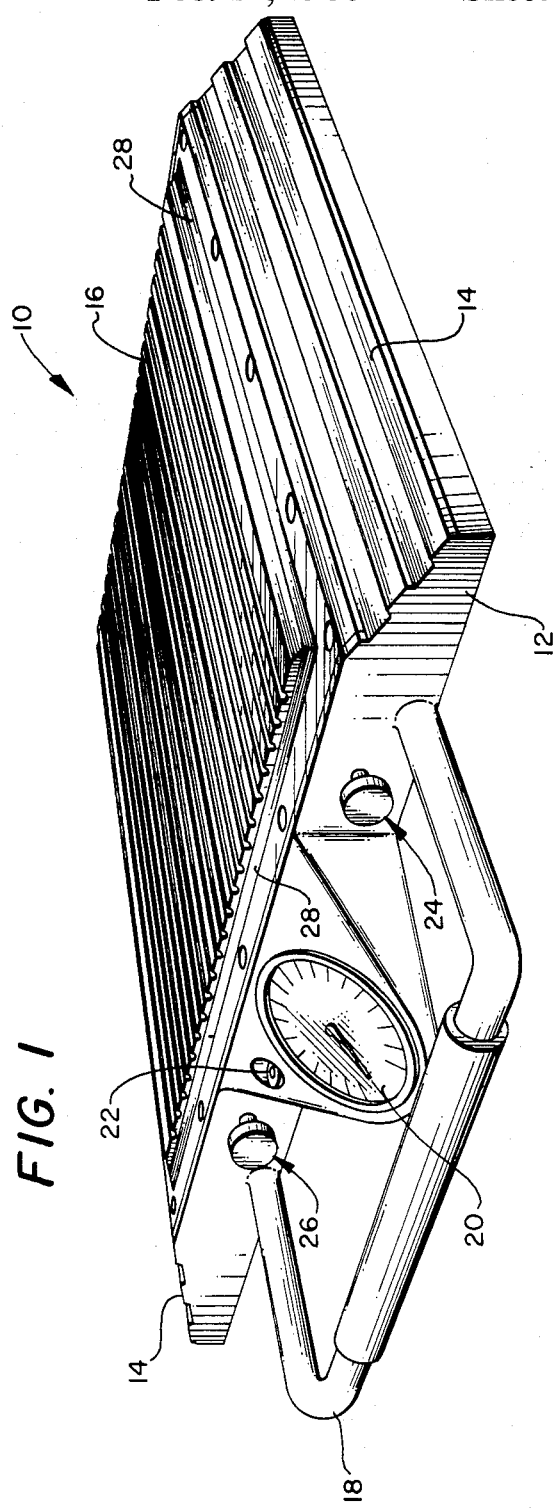
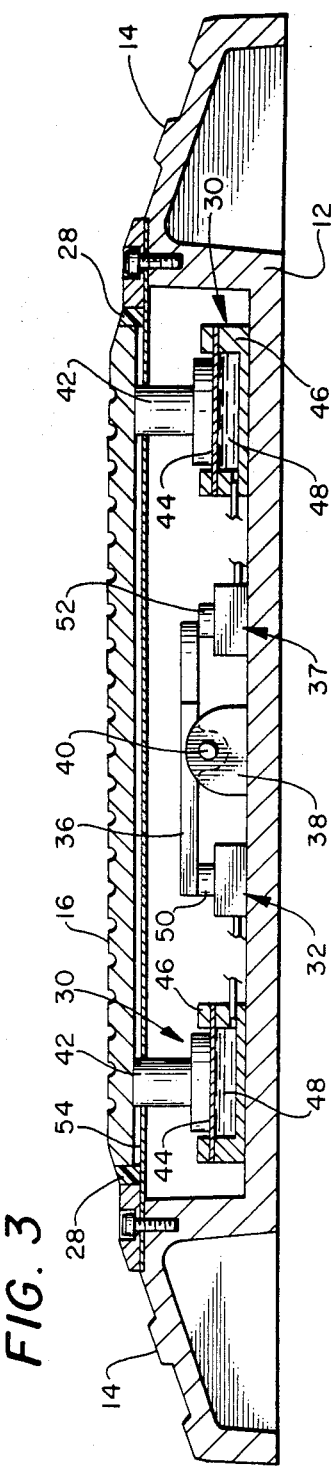
FIG. 1
FIG. 3

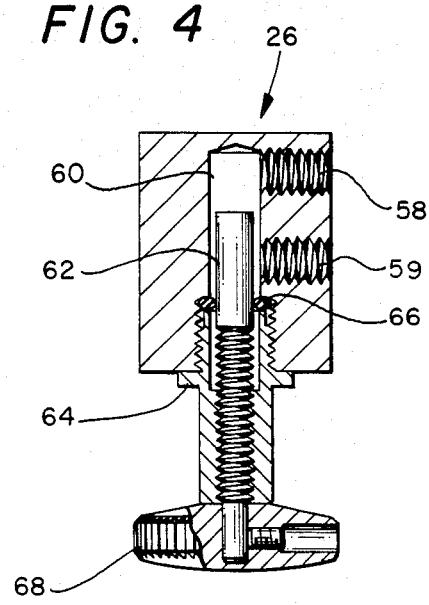

PORTABLE HYDRAULIC SCALE

TECHNICAL FIELD

This invention relates to weighing apparatuses and in particular a hydraulic scale having a plurality of load bearing cylinders connected hydraulically to a plurality of secondary fluid cylinders which act upon a torque plate transferring the signal to a summing fluid cylinder connected to a readout device.

BACKGROUND ART

In the past weighing devices or scales have been constructed in many manners. Most scales have a series of levers and knife edges which transfer force to produce measurable readout. Scales employing knife edges have several disadvantages: friction and wear at the knife edges requires constant maintenance and calibration, the knife edge is subject to damage from lateral forces, and sensitivity to nonhorizontal positions. Also, the production of a lightweight portable scale capable of handling a heavy load has been difficult because of the great stress placed on the relatively small knife edges for load borne by them. Furthermore, portable scales employing knife edges are particularly susceptible to inaccurate readings resulting from canting of the scale off level.

Presently, there is a substantial demand and need for a lightweight, reliable, easily maintained portable scale. Such scales are especially in demand by law enforcement agencies desiring to check the weight of trucks. The scales are also useful in many other applications, such as the weighing of airplanes to determine proper load balance. When scales are used for high volume weighing, such as trucks on the highway, there is a special need for a scale which gives a dynamic readout which does not require the complete stop of a vehicle to obtain an approximation of the load weight. Thus, vehicles clearly within weight limits may proceed without actually stopping; whereas, those at a questionable weight limit can be stopped and weighed more accurately in a static position.

Further, there is a need for a very durable lightweight scale that can withstand abuse from users. For example, a common occurrence in the weighing of trucks is that the truck driver pulls the truck onto the scale and then rapidly applies the brake, creating considerable lateral forces on the scale. This can either severely damage or destroy scales incorporating knife edges.

The present invention provides a portable scale that can provide dynamic or static measurements, is relatively maintenance free, highly durable, and highly reliable.

SUMMARY OF THE INVENTION

In one aspect the scale of the present invention is constructed from a base which supports a plurality of load bearing fluid cylinders. Attached to the load bearing fluid cylinders is a weighing platform. The load bearing pistons are hydraulically connected with a plurality of secondary fluid cylinders which are positioned under one end of a pivotable torque plate. Under the other end of the pivotable torque plate is a summing fluid cylinder which is hydraulically connected to a readout device. A load applied to the platform forces an incompressible fluid from the load bearing fluid cylinders to the secondary cylinders which transmits force to the torque plate which transmits force to the summing cylinder. The force of the summing cylinder is converted to a readout.

In another aspect the present invention relates to a scale device having a plurality of load bearing fluid cylinders supported on a base and support a weighing platform. The load bearing fluid cylinders are hydraulically connected to secondary fluid cylinders which are positioned under one end of a pivotal torque plate. At the other end of the pivotal torque plate is a summing fluid cylinder which is hydraulically connected to a quick flow control valve which has two settings. One setting permits flow of incompressible fluid from the summing cylinder only in the direction of the readout device. This setting permits measurements of a moving load. The other setting on the quick flow control valve permits flow in either direction between the summing cylinder and readout device for static weighing of a load.

In another aspect the present invention relates to a scale having a base supporting a plurality of weight bearing fluid cylinders. The weight bearing fluid cylinders support a weighing platform. The weight bearing fluid cylinders are hydraulically connected to secondary fluid cylinders which are positioned at one end of a pivotable torque plate. At the other end of the pivotable torque plate is a summing hydraulic cylinder. The summing cylinder is hydraulically connected to a quick flow control valve which permits either static or dynamic weighing. Also in the hydraulic line between the summing cylinder and the readout device is a zero adjustment valve. This valve allows the readout device to be zeroed by varying the volume of the space combining the imcompressible fluid.

In yet another aspect of the present invention a sealing diaphragm is provided underneath the weighing platform. The space between the weighing platform and the base and above the sealing diaphragm is filled with an elastomeric material. Thus, in the preferred embodiment the scale produced is a totally sealed system in which the accuracy of the weighing is not effected by foreign matter lodging between the weighing platform and the base or falling down below the base and interfering with the movement of the torque plate. This totally sealed system also protects the scale parts, dial and dial movement from corrosion, contamination and deterioration caused by salt, sand, asphalt, tar, water, etc., therefore assuring that the functioning of the scale will not be impaired.

BRIEF DESCRIPTION OF THE DRAWINGS

A better understanding of the invention and its advantages will be apparent from the Detailed Description taken in conjunction with the accompanying Drawings in which:

FIG. 1 is a perspective view of a portable truck scale;

FIG. 3 is a cross sectional view of FIG. 2 at line AA; and

FIG. 4 is a cross sectional view of the variable volume chamber.

DETAILED DESCRIPTION

Figure 2:
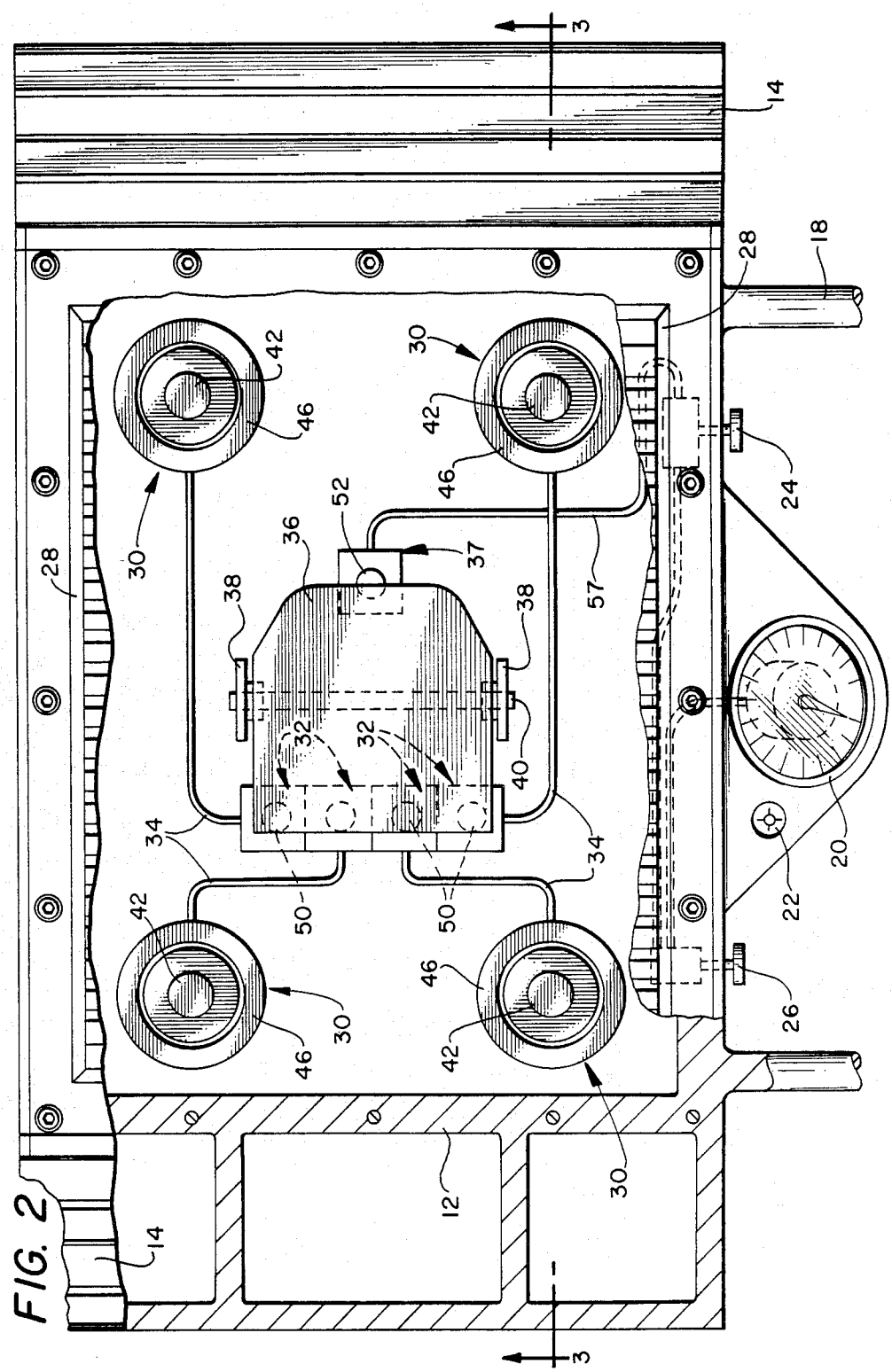
FIG. 2 is a top view of the truck scale with the weighing platform and sealing diaphragm removed.

The present invention is described in terms of the preferred embodiment for a truck scale. It will be recognized that other configurations are possible. FIG. 1 shows the scale assembly 10 where the scale has a base 12 which incorporates on each end a ramp 14 to allow a truck to drive onto weighing platform 16. The scale can be provided with a handle 18 to assist in portability. The scale has a readout means 20 which is illustrated as a bourdon tube. The readout means can consist of any suitable device such as a pressure transducer connected to an electronic meter, for example digital readout device. The scale is also provided with a bubble level 22. In the preferred embodiment a quick flow check valve 24 and a variable volume chamber 26 for zero adjustment of the readout means are also provided. The area between the base 12 and weighing platform 16 is filled with an elastomeric material 28.

FIG. 2 is a top view of the scaled device with the weighing platform 16 and the sealing diaphragm removed. Affixed to the base 12 are weight supporting pistons 30 connected hydraulically to secondary cells 32 by hydraulic lines 34. The secondary cells 32 are positioned under one end of a torque plate 36 which is supported on support means 38 and pivotally attached via pin 40. Positioned under the other end of pivotal torque plate 36 is summing cylinder 37.

FIG. 3 is a cross sectional view of FIG. 2 taken at line AA. In the FIGURE a base 12 and weighing platform 16 are shown in cross section as well as the piston 42 of two load bearing cylinders 30. Piston 42 is attached to weighing platform 16. The piston rests upon diaphragm 44 which is held in place by walls 46 of the load bearing cylinder 30. Underneath the diaphragm 44 is a fluid chamber 48. The fluid chamber 48 contains an incompressible fluid, for example, hydraulic fluid. The fluid chambers 48 are connected to secondary cylinders 32 by hydraulic lines 34 which are not shown in FIG. 2 for purposes of clarity.

A force exerted upon weighing platform 16 forces fluid from fluid chamber 48 into the secondary cylinders 32 which causes the piston 50 of the secondary cylinder to push up upon the torque plate 36, forcing the piston 52 of the summing cylinder 37 down forcing incompressible fluid to the readout means. Foreign matter is prevented from entering the interior of the base by sealing diaphragm 54 and elastomeric material 28. In the preferred embodiment sealing diaphragm 54 is a stainless steel diaphragm.

In the preferred embodiment the torque plate 36 is pivotally connected to the support means 38 by pin 40 resting on hardened steel roller bearings. This provides an extremely low friction pivot point for the torque plate. In the preferred embodiment the diaphragm 44 of load bearing cylinders 30 is a stainless steel diaphragm because of its resistance to environmental extremes.

The summing assembly of the present invention is also a significant advancement. Individual loads from each load bearing cylinder 30 are transferred to the secondary cylinders 32 where they push against the torque plate 36, thereby integrating the weight on the weighing platform 16 regardless of its position on the weighing platform. Further, the torque plate 36 is connected to the summing cylinder 37 such that it applies pressure directly upon the center of the summing cylinder 37. This prevents inaccuracies which can arise from wedging of the piston 52 of the summing cylinder 37 against the piston wall. The system is totally sealed after being charged with a suitable hydraulic fluid. Preferably the hydraulic fluid has been deaerated. Preferably the system is charged with oil which has been deaerated under a vacuum.

The apparatus of the present invention eliminates maintenance problems and maintains the calibration of a scale.

The scale system may also be used for widely diversed weighing points. For example, three platforms can be used to weigh aircraft. The platforms can be connected to a central readout by hydraulic lines which permits the total weight of the aircraft, as well as, weight distribution to be easily determined. Thus, a highly portable scale system can be configured and assembled from separate weighing platforms utilizing the apparatus of the present invention.

It is preferred that each load bearing cylinder be connected to a separate secondary cylinder. This prevents a load which is off center on the weighing platform from bottoming out the closest load bearing cylinder. Such an action would produce an erroneous measurement because the full force of the weight would not be transferred to the secondary cylinder. The number of load bearing cylinders may vary according to the size and shape of the weighing platform, and the needs of the load being weighed.

As explained above, a major benefit with the apparatus of the present invention is that it is highly resistant to damage from lateral forces applied to the weighing platform, and foreign matter such as dirt and grime. The elimination of knife edges and levers and their replacement with hydraulic cylinders allows the scale to operate with very little movement of the weighing platform.

The present invention has made an extreme advance over the art in that the weighing platform moves very little. For example, prior truck scales utilizing knife edges, levers, and mechanical linkages require a movement of the weighing platform of up to about ⅜ of an inch and usually more than ¼ of an inch. In contrast the present invention allows the same load, up to 20,000 pounds (e.g. truck scales) to be weighed with a movement of the weighing platform of approximately 0.002 inches. This slight movement combined with a plurality of relatively large weight supporting cells makes the scale extremely resistant to damage or destruction by lateral forces exerted, for example when a truck applies its brakes rapidly on the scale platform. Preferably the weighing platform will move less than about 0.01 of an inch and preferably less than about 5 mils. The present invention is constructed such that lateral forces are borne by the large surface areas where the pistons and cylinder walls of the weight bearing cells contact; thus, lateral forces are not concentrated at a particular point such as where knife edges are used. Foreign matter such as dirt and grime are kept away from the operational mechanism by the sealing diaphragm and the elastomeric seal. Utilization of such a sealing method is also made possible by the hydraulic construction.

In a preferred embodiment the apparatus of the present invention incorporates a quick flow check valve 24 in the hydraulic line 57 connecting the summing cylinder 37 and readout means 20 (see FIG. 2). The valve has two positions. In the first position the valve permits flow only in the direction from the summing cylinder to the readout means. Thus when a load moves over the platform the highest load will be measured. In the other position the valve allows flow in either direction and is used for static weighing. Thus, a load, for example, a truck may be weighed while moving. This permits trucks which are well below the legal load limit to be processed quickly. Trucks which are overweight or close to the limit can be stopped and weighed in the static position.

In a preferred embodiment the apparatus of the present invention incorporates a variable volume chamber 26 placed in the hydraulic line 57 between the summing cylinder 37 and the readout means 20 (See FIG. 2). This permits the readout means 20 to be zeroed by adjusting the volume of the chamber. Prior devices had achieved zero adjustment of the readout means by mechanical adjustment of the indicator or internal apparatus of the readout means. This is undesirable because the parts of the readout means which have been adjusted were typically very delicate. The present invention allows zeroing of the readout means by adjustment of the volume of variable volume chamber 26, thus the mechanism of the readout means is protected from possible damage to its delicate mechanism by adjustment of the zero. FIG. 4 is a cross sectional view of variable volume chamber 26. The variable volume chamber has an inlet opening 58 to permit connection of the cylindrical interior chamber formed by walls 50 to its connection in hydraulic line 57, and an outlet opening 59 for connection of the interior chamber with the portion of the hydraulic line going to the readout means. The volume of the interior chamber is adjusted by moving plunger 62, which is connected by any suitable means, such as nut 64 and sealing means 66. The plunger 62 is moved by manipulated knob 68, thereby adjusting the volume of the interior chamber and in turn the readout indicated by the readout means.

The scale device can be assembled without the variable volume chamber, or quick flow check valve. The scale can also incorporate either the quick flow check valve or the variable volume chamber or both.

While the preferred embodiment of the present invention has been described in detail, and shown in the accompanying Drawings, it will be evident that various further modifications are possible without departing from the scope of the invention.

We claim:
1. A weighing apparatus comprising:
   (a) a base;
   (b) at least two load bearing fluid cylinders attached to said base, said load bearing fluid cylinders having a load bearing piston;
   (c) a weighing platform supported by said load bearing piston of said load bearing cylinder;
   (d) a torque plate support affixed to said base;
   (e) a torque plate pivotally attached to said torque plate support;
   (f) a plurality of secondary fluid cylinders supported by said base, positioned under one end of said pivotal torque plate, and hydraulically connected to said load bearing cylinders;
   (g) a summing cylinder supported by said base, and positioned under the end of the torque plate opposite the end of the torque plate over the secondary cylinders; and
   (h) a readout device hydraulically connected to said summing cylinder.

2. The apparatus of claim 1 having four load bearing fluid cylinders and a separate secondary cell connected to each load bearing cylinder.

3. The apparatus of claim 1 and further comprising a check valve located between the summing cylinder and readout means and said valve when applied permits flow only in the direction from the summing cylinder to the readout means.

4. The apparatus of claim 2 and further comprising a check valve located between the summing cylinder and readout means which has a position which permits flow only in the direction from the summing cylinder to the readout means.

5. The apparatus of claim 1 wherein said torque plate support, torque, secondary fluid cylinders, and summing cylinder are located underneath the weighing platform and do not interfere with movement of the weighing platform.

6. The apparatus of claim 1 further comprising a stainless steel sealing diaphragm underneath said weighing platform and connected to said base, said sealing diaphragm being flexible.

7. The apparatus of claim 1 further comprising a seal of elastomeric material between said weighing platform and said base.

8. The apparatus of claim 1 further comprising a variable volume chamber located between the summing cylinder and the readout means, which permits the volume of the hydraulic system to be varied to allow zero adjustment of the readout means.

9. The apparatus of claim 2 further comprising a variable volume chamber located between the summing cylinder and the readout means, which permits the volume of the hydraulic system to be varied to allow zero adjustment of the readout means.

10. The apparatus of claim 3 further comprising a variable volume chamber located between the summing cylinder and the readout means, which permits the volume of the hydraulic system to be varied to allow zero adjustment of the readout means.

11. The apparatus of claim 4 further comprising a variable volume chamber located between the summing cylinder and the readout means, which permits the volume of the hydraulic system to be varied to allow zero adjustment of the readout means.

12. The apparatus of claim 2 wherein said torque plate support, torque, secondary fluid cylinders, and summing cylinder are located underneath the weighing platform and do not interfere with movement of the weighing platform.

13. The apparatus of claim 2 further comprising a stainless steel sealing diaphragm underneath said weighing platform and connected to said base, said sealing diaphragm being flexible.

14. The apparatus of claim 2 further comprising a seal of elastomeric material between said weighing platform and said base.

15. The apparatus of claim 1 wherein said readout device is a bourdon tube.

16. The apparatus of claim 1 wherein said readout device is comprised of a pressure transducer connected to an electronic meter.

17. A weighing apparatus comprising:
   (a) a base;
   (b) at least two load bearing fluid cylinders attached to said base, said load bearing fluid cylinders having a load bearing piston;
   (c) a weighing platform supported by said load bearing piston of said load bearing cylinder;
   (d) a torque plate support affixed to said base;
   (e) a torque plate pivotally attached to said torque plate support;
   (f) a number of secondary fluid cylinders equal to the number of said load bearing fluid cylinders, positioned under one end of said pivotal torque plate, and each of said secondary fluid cylinders is connected to a separate one of said bearing cylinders;

(g) a summing cylinder supported by said base, and positioned under the end of the torque plate opposite the end of the torque plate over the secondary cylinders; and (h) a readout device hydraulically connected to said summing cylinder.

18. The apparatus of claim 17 wherein said torque plate support, torque, secondary fluid cylinders, and summing cylinder are located underneath the weighing platform and do not interfere with movement of the weighing platform.

19. The apparatus of claim 18 further comprising a check valve located between the summing cylinder and readout means which has a position which permits flow only in the direction from the summing cylinder to the readout means; and a variable volume chamber located between the summing cylinder and the readout means, which permits the volume of the hydraulic system to be varied to allow zero adjustment of the readout means.

20. The apparatus of claim 19 wherein said readout device is a bourdon tube.

21. The apparatus of claim 19 wherein said readout device is comprised of a pressure transducer connected to an electronic meter.

* * * * *